June 21, 1938.   R. C. DEANS   2,121,072

ARTIFICIAL FLY FOR FISHING

Filed May 18, 1936

Inventor:
Robert Campbell Deans
By J. R. Jochum
Attorney

Patented June 21, 1938

2,121,072

UNITED STATES PATENT OFFICE 2,121,072

ARTIFICIAL FLY FOR FISHING

Robert Campbell Deans, Glasgow, Scotland

Application May 18, 1936, Serial No. 80,339
In Great Britain June 1, 1935

15 Claims. (Cl. 43—48)

This invention relates to artificial flies as used for fishing.

The object of the present invention is to make a better and more useful artificial fly than heretofore and the invention consists in making the wing (or wings) of the artificial fly of cellulosic or like material, preferably more or less transparent, in the form, not of a single piece, but of a group or bunch composed of a plurality of thread-like, flexible fibres, (hereinafter referred to as "fibres") which will give a more natural appearance and will not be so liable to be damaged in use, the fibres of the bunch being all securely anchored by careful fastening to the hook of the fly so that should some of them be broken off in use, a serviceable wing (or wings) would still remain.

The wings may be of the "wet fly", "rolled", "upright", or "tied back", "split winged" or other known types.

The cellulosic material I prefer to use is what is known as "Cellufil" or "viscose straw", or "Cellophane" (registered trade-mark) in the form of fibres.

In carrying out the invention, under one arrangement, the fibres used for the wing (or wings) may be formed from a strand (or strands) of shiny cellulosic material of suitable length which may be doubled, redoubled and so on, or coiled to form a bunch of any desired number of convolutions, and, in this condition, it is applied to the hook of the fly and is securely tied thereon, by a thread, as usual, so as to form the wing (or wings). Thereafter, the outer end of the bunch is cut and trimmed off and the tip of the wing (or wings) shaped, also the head of the wing at the hook-eye. The cutting of the outer end of the bunch forms it into a group of flexible fibres or filaments which project from the head of the fly as do the feather parts in an ordinary "feathered" fly. When the wings are made in this manner the artificial fly, when finished, has a most natural appearance and is readily taken by the fish.

Instead of making a wing in the manner aforesaid it may be made of a series of short fibres of the cellulosic or like material cut from a sheet, or otherwise, and bunched together and cut and/or shaped before applying to the hook; or, if desired, a piece of sheet or tape Cellophane or like material may be partially cut up or slit to form a series of close narrow fibres and then secured to the hook, whereafter the uncut end can be removed so as to leave a bunch or group of independent fibres projecting from the fly in the form of a wing (or wings).

Bits or strips of feather or other coloured material can be added to, intermixed with, or arranged below, the cellulosic wing material in order to color the wings or the material itself may be dyed, painted, or otherwise colored before or after being applied to the hook.

The hackle may be tied on in front or behind the wings.

If so desired the hackle may also be composed wholly or partly of the cellulosic fibres.

The invention will now be described with reference to the accompanying drawing, in which:—

Figure 1:
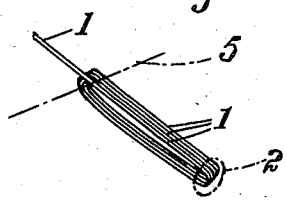
Figs. 1 and 2 illustrate different methods of forming the wings.

In carrying out the invention as illustrated in Fig. 1, the fibres 1 used for the wing (or wings) are formed by winding or doubling or coiling a length (or lengths) of the cellulosic or like material into a bunch of any desired number of convolutions. One end of the bunch is securely tied to the head of the hook as indicated by the chain dotted line 2, Fig. 1, and is then trimmed off, if necessary. The other, or outer end, is cut across as indicated by the chain dotted line 5 and thereafter trimmed to give the desired shape of wing (or wings) to the bunch of fibres so formed.

Figure 2:

In an alternative method as illustrated in Fig. 2 the fibres 1 are formed by cutting a piece of suitable thin cellulosic or like material into a number of closely spaced fibres not extending quite the whole length of the piece and so leaving an uncut part 9 which serves as a connecting member for the cut fibres which is removed after securing them to the hook.

Figure 3:
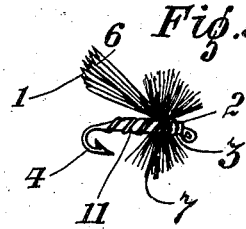
Figs. 3 and 4 are respectively a side and front view of a fishing fly in accordance with the invention.
Figure 4:
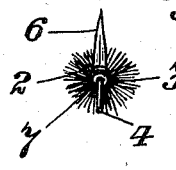
Figure 5:
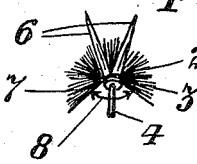
Fig. 5 is a front view of a modification.

Referring to Figs. 3 and 4, these show a fly wherein the fibres 1 forming the wing 6 are tied by one end to the head 3 by a thread or winding 2 with the result that the other end of the fibres will be free from each other and from the head or hook. This thread or winding may be of the material known as "Cellufil" or other material similar to that used for the wings. Mucilage or the like substance may be applied to the wing 6 so that the fibres 1 can be stuck together and be suitably bunched or shaped to give the desired appearance. The hackle 7 extends more or less completely round the body 11 but in the modification shown in Fig. 5, which shows a "split-winged" fly, a V-shaped part 8 is omitted or cut away from the hackle 7 underneath the body in view of the weight of the "Cellufil", "Cellux", or the like material in order to make the fly float better in the case of a "dry" fly.

Figure 6:
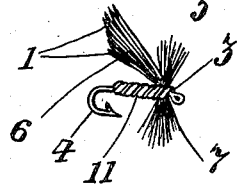
Fig. 6 is a view of a further modification.

Fig. 6 shows a fly, wherein the fibres 1 of the wing have no mucilage or other adhesive applied thereto so that they remain spread out as shown and wherein the body 11 is made by winding a material similar to that used for the wing and reinforced with varnish or other suitable substance.

The mucilage or other suitable substance which is used for stiffening and consolidating the fibre wing (or wings) and improving the appearance may be such as to remain permanently on the wing or may be such that it will be removed before or during fishing by water or other agent.

Fishing flies as above described are more natural in appearance owing to the nature of the material used for the wings. The shiny or glittering nature of the material more closely simulates the natural appearance of insect wings, and the formation of these wings by a large number of flexible fibres in accordance with the invention ensures that the wing has all the movements of a feathered wing when finished but in addition has a more natural appearance and that the wing as a whole, will remain even although one or more of the fibres are broken or pulled off. This effect is due to the more or less separate anchorage provided for each fibre.

The material used for the wings is generally transparent but can be suitably coloured as required and the number of separate fibres in a wing is generally from eight upwards.

The above specific descriptions have been given merely by way of example and modifications may be made, without departing from the scope of the invention. For example, the wings may be formed by gathering together a bundle of single fibres and then, as a bunch, securing or anchoring them in position.

The term "cellulosic material" used in the following claims is to be understood as covering cellulose products such as "Cellophane", "Cellufil", "Cellux", "viscose straw" or the like.

What I claim is:—

1. In an artificial fishing fly including a hook, a wing or wings made of cellulosic material in the form of a group or bunch composed of a relatively large number of flexible threadlike fibres of the material, and means for anchoring said fibres to the hook.

2. In an artificial fishing fly including a hook, a wing or wings made up of a relatively large number of individual flexible, threadlike fibres of cellulosic material, and means for attaching said fibres to the hook.

3. In an artificial fishing fly including a hook, a wing or wings made up of individual flexible, threadlike fibres of cellulosic material, and a hackle formed of cellulosic material.

4. In an artificial fishing fly, a wing or wings made of cellulosic material in the form of a group or bunch composed of a plurality of flexible, threadlike fibres of the material, and a plurality of reinforcing feather pieces.

5. In an artificial fishing fly, a wing or wings made of cellulosic material in the form of a group or bunch composed of a plurality of coloured flexible, threadlike fibres of the material.

6. In an artificial fishing fly including a hook, a wing or wings made of cellulosic material in the form of a group or bunch composed of a plurality of flexible, threadlike fibres of the material, means for attaching the fibres to the hook and a body portion formed by convolutions of said material on the hook.

7. The method of forming an artificial fishing fly with a wing or wings of thin, flexible cellulosic material which comprises cutting a piece of said material with a series of close cuts to form a bunch of fibres connected by a common uncut portion and attaching said bunch to the hook, and then removing the uncut portion.

8. The method of forming an artificial fishing fly with a wing or wings of cellulosic material which comprises forming a thread of said material into a number of side by side convolutions or loops, cutting said convolutions or loops to form a bunch of fibres and tying said bunch to the hook.

9. A wing for an artificial fishing fly comprising a considerable number of flexible, threadlike fibres of cellulosic material trimmed to wing shape.

10. A "split-winged" artificial fishing fly comprising a body, two wings composed of flexible, threadlike strands of cellulosic material projecting upwardly from said body and a hackle extending only partly round the body and leaving a gap to assist flotation.

11. A wing for an artificial fishing fly comprising a large number of threads of cellulosic material trimmed to shape, and adhesive means for bunching said fibres together.

12. In an artificial fishing fly including a hook, a wing or wings comprising individual flexible, threadlike fibres of cellulosic material anchored only at one end, the other end of the fibres being free and disconnected from each other and from the hook, and a hackle formed of a cellulosic material.

13. The method of forming an artificial fishing fly with a wing or wings of cellulosic material, which consists in providing a plurality of flexible, threadlike fibres initially connected together at one end, the other end of the fibres being free from each other, and securing the separated free ends of the fibres to a hook in closely assembled relation, and finally severing the initially connected ends of the fibres to provide independent and separated strands.

14. In an artificial fishing fly including a hook, body projections formed of cellulosic material in the form of a group or bunch composed of a relatively large number of flexible, threadlike fibres of the material, and means for attaching said fibres to the hook.

15. In an artificial fishing fly including a hook, a hackle made up of individual flexible threadlike fibres of cellulosic material.

ROBERT CAMPBELL DEANS.